F. O. WOODLAND.
TWO-CYCLE INTERNAL COMBUSTION ENGINE.
APPLICATION FILED JAN. 29, 1912.

1,104,596.

Patented July 21, 1914.

2 SHEETS—SHEET 1.

Witnesses.
Ella P. Blenus
Wm C. Howes

Inventor.
Frank O. Woodland
By Chas H. Burleigh
Attorney.

UNITED STATES PATENT OFFICE.

FRANK O. WOODLAND, OF WORCESTER, MASSACHUSETTS.

TWO-CYCLE INTERNAL-COMBUSTION ENGINE.

1,104,596.  Specification of Letters Patent.  Patented July 21, 1914.

Application filed January 29, 1912. Serial No. 674,176.

*To all whom it may concern:*

Be it known that I, FRANK O. WOODLAND, a citizen of the United States, residing at Worcester, in the county of Worcester and State of Massachusetts, have invented a new and useful Improvement in Two-Cycle Internal-Combustion Engines, of which the following is a specification, reference being made therein to the accompanying drawings.

This invention relates to internal combustion engines more particularly designed for automobiles, motor-cars, motor-trucks and other locomotive or power mechanisms, and in which vapor-gas of gasolene, oil, or similar hydro-carbon fuel is employed.

The prime object of my present invention is to provide a simple and efficient means for controlling the ingress and egress of gases in an internal combustion engine, in a manner to avoid excessive mingling of the incoming charge of fresh gas, or explosive mixture, with the spent gases within the combustion chamber.

Another object is to provide, in an internal combustion engine of that class in which the spent charge is ejected from the combustion chamber by the in-coming charge, of a method and means for introducing an interposed layer or stratum of air between the spent-charge and in-coming charge within the combustion chamber, as more fully hereinafter explained.

Another object is to provide a two-cycle engine having a simple tubular piston including the combustion chamber within the piston, with means for taking in the charge of explosive gas in an approximately concentric manner near one end of said chamber, and circumferentially exhausting the spent charge near the other end of said chamber.

These objects I attain by mechanism embodying the peculiar idea of means and organized for operation as illustrated in the accompanying drawings, wherein—

Figures 1, 2:
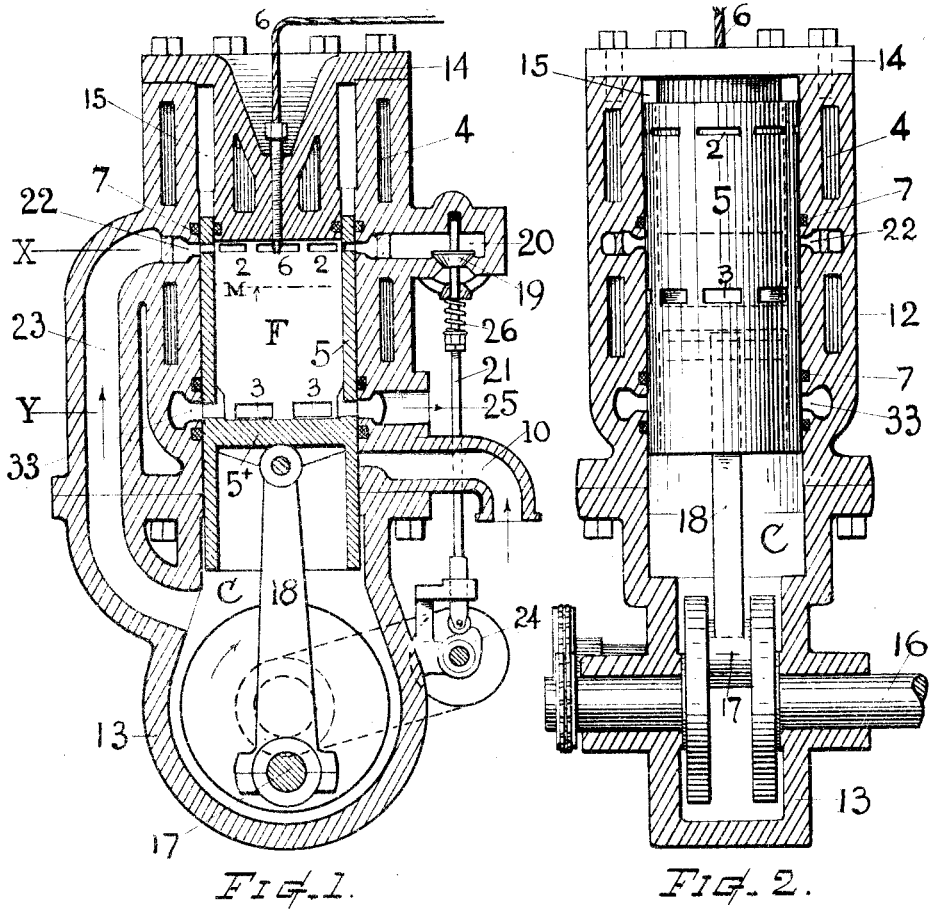
Figures 3, 4:
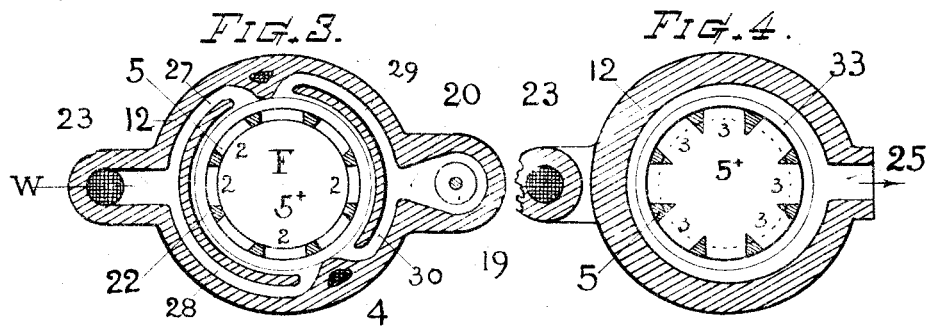
Figure 5:
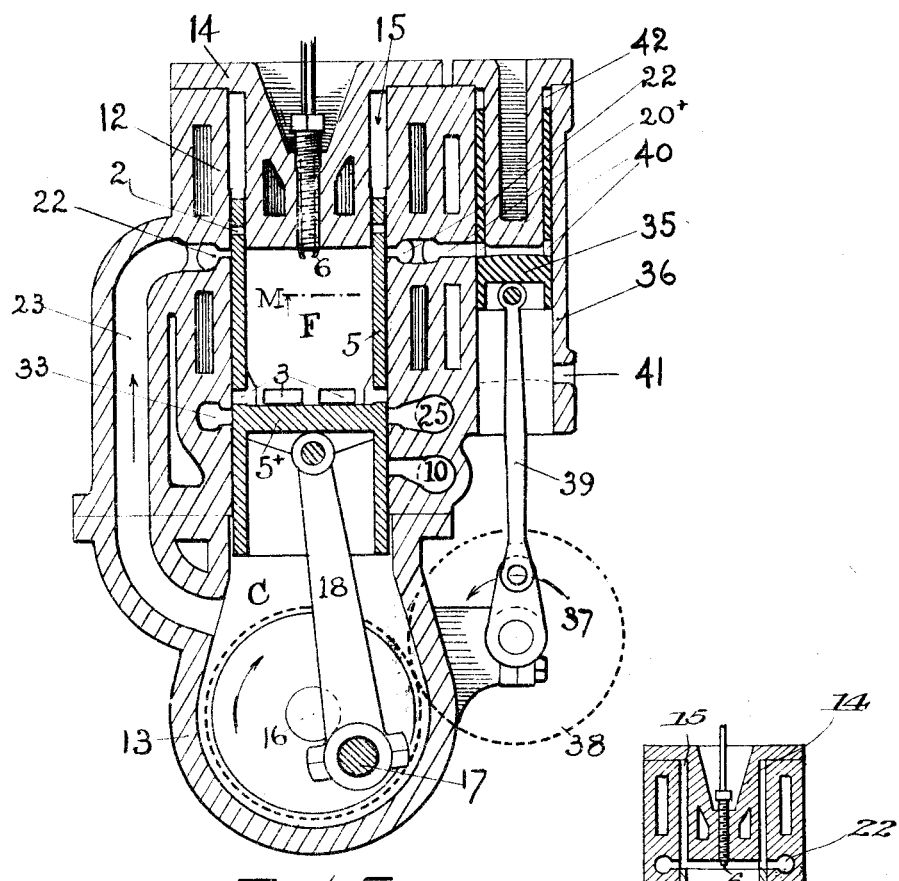
Figure 6:
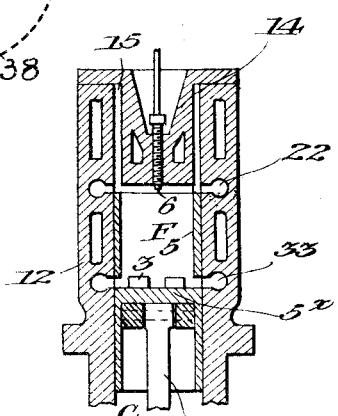

Figure 1 is a central section in the direction of line W, Fig. 3, of a two-cycle internal combustion engine illustrating my invention; the piston being at its extreme outward position. Fig. 2 is an elevation view with the cylinder shown in section and the piston shown in side view, the piston being at three-quarter stroke up, or near its inward position. Fig. 3 is a transverse section at the position of line X, Fig. 1; Fig. 4 is a transverse section at the position of line Y on Fig. 1, Fig. 5 is a central section showing a means whereby the admitted air is positively forced into the cylinder; Fig. 6 is a fragmentary section view showing a slight modification, whereby the tubular extension of the piston is foreshortened to admit the intake of the charge over the edge thereof.

Referring to parts, the numeral 12 indicates the engine cylinder; 13 the closed crank-casing attached to the lower or outer end of the cylinder, and adapted to include the compression-chamber C; 14 the cylinder head having an inwardly extended cylindrical portion that is somewhat longer than the piston movement, and reaches some distance within the cylinder proper, with an annular space 15 between the two cylindrical surfaces, into which space the end of the piston is projected in its movement, and provided with a water-jacket space 4.

The piston 5 consists of a tubular barrel or shell with a solid head or disk $5^+$ located at an intermediate position therein, to which the connection-rod is jointed. Said piston is fitted to slide within the cylinder 12 with a reciprocative action. The tubular portion above the piston-disk $5^+$ extends up to the annular recess 15; the space between the cylinder-head and piston-disk, within this tubular portion of the piston, being the combustion-chamber F, wherein the firing of the gas is effected. A tubular part of the piston projects below the disk for a distance sufficient to close the cylinder ports when the piston moves toward the inner end of the cylinder.

16 indicates the engine shaft, and 17 the crank or wrist-pin to which connection is made from the piston 5 by the connection-rod 18 in the usual manner; said parts being inclosed in the casing 13. The piston is provided near its upper end with ports 2 which open through the shell into the interior space F that constitutes the explosion chamber:

preferably an annular row or ring of ports all in the same plane perpendicular to the axis of the cylinder. The piston also has a second row of ports 3 formed through the tubular shell at or near the piston disk or partition 5+.

The inner face of the cylinder 12 is provided, at a position approximately in line with or slightly below the inner end of the cylinder head 14, with a circular groove or circular row of ports 22 having a co-mating relation with the ports 2 of the piston when the latter is at the outward limit of its stroke, or approximately so. Said groove 22 communicates through a passage 23 with the chamber C in the crank-case. The cylinder is also provided with a circular groove or row of ports 33 having a registering relation with the ports 3 of the piston, which groove communicates with the exhaust exit 25. Both these sets of ports 2—22, and 3—33, come into open relation when the piston is at its outer position, or near the lower end of the stroke, and are closed for cutting off the passage of gases, by the action of the piston as it moves toward the cylinder head, the forwardly projecting tubular end of the piston moving up within the annular recess 15. The groove 22 connects through suitable openings or directly, with the induction passage 23 leading from the crank-case chamber C, for conducting the charge therefrom to the chamber F.

The ports 2 and 22 are designed and arranged to form, as nearly as practicable, a circumferential ingress from which the gas and air flows radially inward into the chamber F, from all sides simultaneously, in a plane perpendicular to the axis of the piston, and close to the surface of the head; thereby forming a compact cylindrical mass or body of gas that forces down the mass of spent gas without excessively mingling therewith; while the spent gases in like manner pass out at all sides of the circle through the ports 3, the scavenging being thus effected as a uniform lowering of the contained cylindrical mass, in contradistinction to the exhaustion from one side of the mass. The cylinder is best provided with suitable packing rings 7 arranged about the piston at the positions indicated.

10 indicates the supply pipe leading from a carbureter or source of vapor-gas fuel. The carbureter and means for throttling may be of any approved type, and as such devices are common and well known they are not herein shown; the only essential being a supply of vapor-gas through the pipe 10 which leads into the chamber C, and which is controlled by the action of the piston serving as its valve.

6 indicates the sparking-plug or ignition means, which may be of any suitable construction, and controlled for igniting charge at the proper instant in well known manner.

In lieu of forming ports 2 through the piston extension, and having the end of the tubular portion extend beyond the port openings, the tubular portion may in some instances be terminated, as illustrated in Fig. 6 on a line corresponding to the position of the lower edge line of the ports, so that the inflow from the surrounding port or groove 22 of the cylinder, will be discharged from all sides, across and over the top-edge of said tubular piston, immediately adjacent to the inner-end face of the cylinder-head; the inflow of the charge being substantially similar to the inflow through the row of ports 2.

Another feature of my invention provides a means for the introduction or admittance of air into the combustion-chamber preceding the charge of explosive mixture, in a manner that practically forms a layer or disk-like mass of air between the in-coming explosive charge and the out-going spent gases within the combustion-chamber F, thereby to give an effectual division between the charge and spent gases preventing the mingling of the fresh explosive-mixture and spent material, and effecting thorough scavenging without loss of explosive efficiency. The means for attaining this introduction of air may be variously constructed and located, and is not confined to the precise details herein shown; but the invention involves the means embodying the principle, of filling the delivery-end of the induction-passage, or a circumferential space in the cylinder-shell which constitutes the ingress port, with a volume of air under a desired degree of pressure, and in such manner and relation that when the piston reaches the point where the inlet-ports open for admitting the charge the volume of air passes laterally into the combustion-chamber at one end thereof, from the opposite sides, approximately about the entire circle, adjacent to the head, and preceding the inflow of the explosive mixture; the air disposing itself in a cylindrical or approximately disk-like mass, which is in like manner followed by the charge of explosive mixture; the air lying between said mixture and the spent-gases, while the latter are expelled through the exhaust ports; as may also be a portion of the air at the latter stage of the action, so that practically all of the spent-gas escapes from the chamber before the ports close and the firing occurs. In the present instance, as shown in Figs. 1 and 3, the embodiment consists of an air inlet passage 20 controlled by a valve 19, actuated by a connection 21 and cam 24 on a shaft driven in suitable manner and operating in unison with the engine shaft 16. A spring 26 may be used to aid in closing the valve. The air-inlet passage 20 communicates with the gas-induction passage 23, or groove 22, and through the ports 2 with the interior of the combustion-chamber F. The passages 23 and 20 are preferably bifurcated and carried partly around the circle within the cylinder-shell to connect with the channel or groove 22 at opposite sides, approximately as shown at 27 and 28, and 29 and 30 on Fig. 3, the better to equalize the flow about the entire circumference of the row of ports 2.

In the operation, the movement of the piston is from the position shown in Fig. 1 to the position of the dotted line M. The upward or inward part of the stroke compresses the charge which is confined in chamber F wholly within the tubular part of the piston between the disk 5* and cylinder-head 14; and a partial vacuum is created in the chamber C. When the inlet 10 is uncovered by the lower end of the piston, and the valve 19 is opened by the cam 24 or controller means, the vapor-gas from the carbureter passes into the chamber C, and atmospheric air passes into the inlet 20 to a greater or less amount, regulated by the length of time the valve 19 is held open; the air occupying the space within the groove 22 and more or less of the passage 23. As the ports 2 and 22 come into coincident relation the pressure in chamber C causes a flow through the passage 23, the air occupying the space 22 and upper part of passage 23 flows into the chamber F preceeding the volume of vapor-gas from the chamber C, which follows the air into one end of the piston chamber F, while the spent gases flow out laterally at the other end of said chamber; the fresh charge, the intermediate air and the spent-gases respectively assuming individual layers, one above the other, in disk-wise order with a minimum of intermingling tendency, the layer of air serving as a neutral partition between the spent and fresh gases. The exhaust ports 3 and 23 commence to open a little before the opening of the inlet ports 2 and 22, and remain open until the inlet ports close, thereby favoring the complete scavenging before compression of the fresh charge commences. The up stroke of the piston compresses the charge within the chamber F, and ignition thereof is effected by the sparking devices as the piston starts on its downward stroke. The explosion of the compressed charge in chamber F imparts the power-stroke movement to the piston, said movement closing the inlet 10 and compressing the gas within the chamber C; and as the ports 3 and 23 come into coincident relation the product of the combustion is allowed to pass out laterally around the piston, and to escape through the exhaust exit 25; a new charge enters the chamber F as above described, and the operation is repeated; the reciprocating piston imparting power and motion to the crank shaft by its connection, as will be readily understood.

Fig. 5 illustrates an embodiment of my invention wherein the construction is designed for introducing the air by force and under pressure. In this modification there is provided a reciprocating air-pumping piston 35 that works in a supplemental cylinder 36, the interior of which communicates by a suitable passage 20* with the circumferential port or chamber 22 of the engine cylinder 12. The piston 35 is provided with means, as a shaft and crank 37, connected by suitable gearing 38, to work in unison with the engine shaft 16, and a connection-rod 39 operated therefrom is coupled to the pump-piston for actuating the same. The pumping-piston is best made tubular in form with a port or ports 40 that come into registering relation with an intake aperture 41 at the lower end of the stroke, and with the passage 20* to the chamber at the upper end of the stroke. The tubular end of the piston extends into an annular recess 42 in the cylinder head. The piston 35 is preferably made in itself the means for opening the ports or passages 41 and 20*, as shown. When the piston 35 descends the passages 22 and 20* are cut off from the chamber F by the engine piston 5, and the tubular pump-piston 35; a partial vacuum is therefore formed in the pump-chamber until its port 40 comes into register with the inlet port 41, then the air rushes into the pump chamber and is therein compressed as the piston moves upward until its port 40 comes into line with the passage 20* when the compressed air flows into the space or passages 22, which are at that time cut off from the combustion chamber F by the tubular piston 5, the compressed air back presses the explosive mixture in the passage 23. The piston 35 works alternatingly with the movement of piston 5, one ascending while the other descends, and vice versa. The pump crank may be set slightly ahead in its relation, so that the pump piston cuts off the passage 20* before the ports 2 are opened; in such case the inducted air is primarily confined in the space 22 under a pressure equal to the compression of the charge in chamber C. When the ports 2 become opened the air passes into the chamber F in advance of the explosive mixture, and for the purpose of forming an advancing barrier to expel the spent gases and effect a more complete scavenging of the combustion chamber without undue loss of efficiency in the explosive charge.

The introduction of the layer of air, as above described, obviates liability of pre-ignition of the incoming charge, since it prevents the fresh charge of explosive mixture coming into direct contact with the hot product of the previously exploded charge within the combustion chamber. Another desirable result of the introduction of an intermediate layer of air is, that a higher degree of compression can be safely employed; hence greater economy and efficiency is attained in the working.

When the motor is working under but partial capacity and the carbureter is throttled to a greater extent than when full capacity is used the in-draft of air at 20 is greater in volume thus making a thicker layer of air, in the combustion-chamber, between the spent charge and the fresh charge; thereby getting rid of a greater amount of the spent charge than would otherwise ensue; also making it impossible for any of the fresh gases to mingle with the spent gases; hence attaining a more effective explosion and a more perfect action when the machine is running on slow speed.

I claim—

1. In an internal combustion engine of the two-cycle type, the cylindrical tubular piston having a partition-disk or head approximately mid-way thereof, and provided with inlet and outlet ports, one set circumferentially disposed near the upper end of the tubular extension, the other set near the piston disk; in combination with a crank-shaft, a connection thereto from the piston, a compression-chamber, a cylinder within which said piston reciprocates, the cylinder head having an inward extension forming an annular recess to receive the tubular top-end of the piston, said cylinder having upper and lower circumferential, inwardly open grooves, one positioned adjacent to the inner end of the cylinder head, the other positioned below, to register with the respective sets of piston-ports when the piston is at the outward end of its stroke, a fuel-supply inlet into said compression chamber controlled by the lower extended part of the tubular piston, and a feed connecting passage from said compression chamber into the upper circumferential groove of said cylinder, said piston acting as a valve for the circumferential ports of the cylinder and for controlling the fuel inlet.

2. In an internal-combustion engine in which the spent charge is expelled by the incoming charge, the combination, with the engine-cylinder having an annular piston-receiving space at its upper end, and an internal circumferential channel in its wall adjacent to the mouth of said annular space, a reciprocating piston having a tubular extension that enters said annular space and is also adapted to serve as a valve for said circumferential internal channel, a charge-mixing chamber and passage for conducting explosive-mixture therefrom into said circumferential channel, an auxiliary air-inlet way leading into said channel for admitting air thereinto, and a mechanically actuated means for controlling said air-inlet way for positively regulating the supply of air entering therethrough.

3. In an internal combustion engine of the two-cycle type, the combination with the reciprocating tubular piston having a circumferential row of ports therein, and suitable ignition appliances for firing the charge; of a piston-inclosing cylinder provided with a circumferential interior groove or ring of induction-ports with a chamber-space surrounding the same; a charge-supply passage and an air-supply passage, each connecting with said chamber-space and oppositely arranged for alternately filling the chamber-space and port, means in connection with said charge-supply passage for accumulating, compressing and delivering the fuel element, and means coöperating with said air-supply passage for inducting air into said surrounding chamber-space at a predetermined instant, and for limiting the amount of the air inflow.

4. In an internal combustion engine of the two-cycle type, the combination with the cylinder provided with inlet and exit ports, a reciprocating tubular piston having its piston-head or disk at intermediate position therein, and provided with ports adjacent to said disk, the combustion chamber being within said piston tube, of a cylinder-head provided with a cylindrical body portion of less diameter than the cylinder bore, and extending within the cylinder for a distance approximately equal to the extent of the piston stroke, with an annular recess between the cylinder surfaces approximately fitting the tubular end of the piston; means for compressing and conducting the fuel elements into the combustion chamber through said inlet ports near said cylinder-head-extension, suitable ignition appliances for centrally firing the charge, and means for circumferentially introducing a layer of air into the combustion-chamber at a plane adjacent to the inner face of said cylinder head, and preceding the inflow of the fuel element charge into said combustion chamber.

5. A two cycle internal combustion engine, comprising, in combination, a tubular piston including the combustion-chamber, and provided with an upper and lower circular row of ports thereinto, a cylinder in which said piston reciprocates, a cylinder head having an inward extension affording an annular recess for receiving the end of the piston, a closed crank-casing, the inlet from the carbureter leading into said casing and controlled by said piston, circular chambers within the cylinder having ports that coact with the piston ports at the respective planes for intake and exhaust, a passage from the crank-case chamber into the circular intake chamber, an exhaust exit from the other circular chamber, an air inlet way communicating with the circular intake chamber, a controlling means for intermittently operating the air inlet, in unison with the action of the piston, and for a limited time in the cycle of action.

Witness my hand this 25th day of January, 1912.

FRANK O. WOODLAND.

Witnesses:
CHAS. H. BURLEIGH.
C. S. PUTNAM.